United States Patent
Fischer et al.

(10) Patent No.: US 7,016,929 B2
(45) Date of Patent: Mar. 21, 2006

(54) METHOD AND DEVICE FOR CALCULATING A RESULT OF AN EXPONENTIATION

(75) Inventors: Wieland Fischer, Munich (DE); Jean-Pierre Seifert, Munich (DE)

(73) Assignee: Infineon Technologies AG, Munich (DE)

( * ) Notice: Subject to any disclaimer, the term of this patent is extended or adjusted under 35 U.S.C. 154(b) by 17 days.

(21) Appl. No.: 10/825,582

(22) Filed: Apr. 14, 2004

(65) Prior Publication Data

US 2004/0267859 A1 Dec. 30, 2004

Related U.S. Application Data

(63) Continuation of application No. PCT/EP02/11424, filed on Oct. 11, 2002.

(30) Foreign Application Priority Data

Oct. 17, 2001 (DE) ............... 101 51 129

(51) Int. Cl.
G06F 7/72 (2006.01)
G06F 7/552 (2006.01)
(52) U.S. Cl. ..................... 708/606; 708/491
(58) Field of Classification Search ........ 708/606, 708/491, 277
See application file for complete search history.

(56) References Cited

U.S. PATENT DOCUMENTS

| 4,532,638 | A | 7/1985 | Lagger et al. | |
|---|---|---|---|---|
| 6,317,769 | B1 * | 11/2001 | Kobayashi et al. | ......... 708/491 |
| 6,567,832 | B1 * | 5/2003 | Ono et al. | ............ 708/606 |
| 2001/0010077 | A1 * | 7/2001 | McGregor et al. | ......... 713/174 |
| 2002/0010730 | A1 * | 1/2002 | Blaker | ............... 708/491 |
| 2003/0037087 | A1 * | 2/2003 | Rarick | ............... 708/491 |
| 2003/0093453 | A1 * | 5/2003 | Ruehle | ............... 708/606 |

(Continued)

FOREIGN PATENT DOCUMENTS

DE 693 29 929 T2 9/2001

(Continued)

OTHER PUBLICATIONS

Oswald E et al: "Randomized Addition-Substraction Chains as a Countermeasure against Power Attacks"; Cryptographic Hardware and Embedded Systems, 3rd International Workshop, CHES 2001, Paris, France, May 14-16, 2001 Proceedings, Lecture Notes in Computer Science, Berlin, Springer. DE, vol. 2162, pp. 39-50, ISBN: 3-540-42521-7.

(Continued)

*Primary Examiner*—D. H. Malzahn
(74) *Attorney, Agent, or Firm*—Darby & Darby

(57) ABSTRACT

For calculating the result of an exponentiation $B^d$, B being a base and d being an exponent which can be described by a binary number from a plurality of bits, a first auxiliary quantity X is at first initialized to a value of 1. Then a second auxiliary quantity Y is initialized to the base B. Then, the bits of the exponent are sequentially processed by updating the first auxiliary quantity X by $X^2$ or by a value derived from $X^2$ and by updating the second auxiliary quantity Y by $X*Y$ or by a value derived from $X*Y$, if a bit of the exponent equals 0. If a bit of the exponent equals 1, the first auxiliary quantity X is updated by $X*Y$ or by a value derived from $X*Y$ and the second auxiliary quantity Y is updated by $Y^2$ or by a value derived from $Y^2$. After sequentially processing all the bits of the exponent, the value of the first auxiliary quantity X is used as the result of the exponentiation. Thus a higher degree of security is obtained by homogenizing the time and current profiles. In addition, an increase in performance is enabled by a possible parallel performance of operations.

9 Claims, 3 Drawing Sheets

U.S. PATENT DOCUMENTS 6,125,445 A     9/2000   Arditti et al.
6,304,889 B1 * 10/2001   Ehrman ...................... 708/606

FOREIGN PATENT DOCUMENTS

WO     WO-00/25204 A1    5/2000

OTHER PUBLICATIONS

Kocher P: "Timing Attacks on Implementations of Diffie-Hellman, RSA, DSS, and Other Systems"; Advances in Cryptology—CRYPTO '96, 16th Annual International Cryptology Conference, Santa Barbara, CA, Aug. 18-22, 1996, Proceedings of the Annual International Cryptology Conference (CRYPTO), Berlin, Springer, DE, Bd. CONF. Aug. 16, 1996, pp. 104-113, ISBN: 3-540-61512-1.

* cited by examiner

METHOD AND DEVICE FOR CALCULATING A RESULT OF AN EXPONENTIATION

CROSS-REFERENCE TO RELATED APPLICATION

This application is a continuation of copending International Application No. PCT/EP02/11424, filed Oct. 11, 2002, which designated the United States and was not published in English.

BACKGROUND OF THE INVENTION

1. Field of the Invention

The present invention relates to mathematical algorithms for cryptographic applications and, in particular, to calculating exponentiations, as are, for example, used in the RSA crypto-algorithm.

2. Description of Prior Art

The RSA cryptosystem, which is named after its inventors Rivest, R., Shamir A. and Adleman, L., is one of the most frequently used public key cryptosystems. This method is described in section 8.2 of "Handbook of Applied Cryptography," Menezes, von Oorschot, Vanstone, CRC Press, 1996. The RSA cryptosystem can be used to both perform encryptions and to execute digital signatures. Its security is based on the difficult feasibility of the integer-factorizing problem. For both an RSA encryption and an RSA decryption, a modular exponentiation of the following form must be performed:

$$E = B^d \text{ modulo } N$$

Thus B is the base, d being the exponent and N the module.

In RSA encryption, the exponent d is part of the public key. In RSA decryption, however, the exponent d is part of the private key which has to be protected from spying.

It is the task of cryptography circuits to calculate this modular exponentiation securely on the one hand and quickly or efficiently, respectively, on the other hand. Cryptography circuits are frequently used in applications in which calculating and storage resources are limited. Thus, it is not possible to provide high storage or calculating resources on a smartcard which is, for example, used for identification purposes or in connection to money transactions.

The exponentiation is typically calculated by means of the so-called "square and multiply" algorithm, irrespective of whether it is modular or not. For this, reference is made to FIG. 3. At first, the exponentiation without a modular reduction is described. Then it will be explained how the algorithm in the residual class system of the module N can be put into practice.

It is the object to calculate the result E of the exponentiation $B^d$, as is explained in block 30 of FIG. 3. The exponent d is a binary exponent and consists of several bits ranging from a most significant bit (msb) to a least significant bit (lsb). At first, the numbers B, d are provided, as is illustrated in block 32 in FIG. 3. Then the resulting value E is initialized to a value of 1, as is illustrated by block 34.

Subsequently, the exponent d is examined or scanned, respectively, digit after digit, one digit of the exponent being referred to as $d_i$. If the digit or, for example, the bit of the exponent, respectively, currently examined has a value of 1, as is examined by a decision block 36, the left branch in FIG. 3 will be taken. If, however, the bit examined of the exponent has a value of 0, the right branch of FIG. 3 will be taken.

If it is determined by the decision block 36 that the bit examined of the exponent has a value of 1, square step 38 is at first performed, i.e. the current resulting value is squared. Then, in a multiply step 40, the base B is multiplied to the current value of the resulting value E, that is the result of step 38. In a further decision block 42, it is then examined whether there are further digits of the exponent. If this is the case, a return via a loop 46 is performed and it is examined whether the next digit $d_i$ of the exponent comprises a 1 or a 0 (block 36). If the next digit examined equals 0, square step 38' of the right branch of FIG. 3 is performed. In contrast to the left branch, however, no multiply operation, which would correspond to block 40 of the left branch of FIG. 3, is performed in the case that the digit examined of the exponent equals 0.

The procedure described above is repeated, departing from the most significant bit of the exponent d, until the least significant bit has been reached. After processing the least significant bit, block 42 will establish that there are no more $d_i$. The current value of the resulting value E is the overall result E of the exponentiation output in block 30.

In order to make the exponentiation described in FIG. 3 a modular exponentiation, the module N is input in block 32 in addition to the base B and the exponent d. Additionally, a modular reduction takes place in both branches (block 44 in the left branch and block 44' in the right branch) so that, generally spoken, a modular reduction is performed after each multiplication such that the resulting value E at the end of processing for each digit of the exponent is in the residual class of the module N.

It is to be noted that the multiplication and the modular reduction do not necessarily have to be separated into two subsequent steps. In technology, combined multiplication look ahead and reduction look ahead methods allowing an efficient calculation of a multiplication are known. The so-called ZDN algorithm is to be pointed out here in particular.

The square and multiply algorithm shown in FIG. 3, in its most simple form, is problematic for two reasons.

First, when comparing the two branches, an operation is missing in the right branch, that is when a digit of the exponent equals 0. The two branches in FIG. 3 are asymmetrical in that a multiplication (block 40) will be executed if a digit of the exponent equals 1, while there is no corresponding operation in the right branch. This means that the square and multiply algorithm is thus attackable by so-called timing attacks and power analysis attacks. In order to bring about a homogenization for both time and current, i.e. time and power consumption of the circuit are constant irrespective of whether a 0 or a 1 is in the exponent, a dummy multiplication 40' can be introduced in the right branch, wherein the result of the dummy multiplication, however, is not used but only the result of block 38', i.e. of square step.

The dummy multiplication results in a time and current homogenization of both branches but requires calculating resources. The dummy multiplication thus leads to an increased security at the expense of the overall performance of the circuit.

A further disadvantage of the square and multiply algorithm described in FIG. 3 is the fact that this algorithm is not suitable for a parallel execution. When, for example, the left branch is considered, it is not possible to calculate blocks 38 and 40 in parallel since the calculations in block 40 depend on the calculations in block 38. Thus, a calculating unit first has to calculate block 38 and, when the result of the square operation is present, perform the calculations of block 40, i.e. the multiplication of the base to the result of block 38.

SUMMARY OF THE INVENTION

It is the object of the present invention to provide a secure and efficient concept for calculating a result of an exponentiation.

In accordance with a first aspect, the invention provides a method of calculating a result E of an exponentiation $B^d$, B being a base and d being an exponent, wherein the exponent can be described by a binary number from a plurality of bits, the method including the following steps: initializing a first auxiliary quantity X to a value of 1; initializing a second auxiliary quantity Y to the base B; sequentially processing the bits of the exponent by: updating the first auxiliary quantity X by $X^2$ or by a value derived from $X^2$ and updating the second auxiliary quantity Y by X*Y or by a value derived from X*Y, if a bit of the exponent equals 0, or updating the first auxiliary quantity X by X*Y or by a value derived from X*Y and updating the second auxiliary quantity Y by $Y^2$ or by a value derived from $Y^2$, if a bit of the exponent equals 1; and after sequentially processing all the bits of the exponent, using the value of the first auxiliary quantity X as the result of the exponentiation.

In accordance with a second aspect, the invention provides a device for calculating a result E of an exponentiation $B^d$, B being a base and d being an exponent, wherein the exponent can be described by a binary number from a plurality of bits, having: an initializer for initializing a first auxiliary quantity X to a value of 1 and a second auxiliary quantity Y to the base B; a processor for sequentially processing the bits of the exponent by: updating the first auxiliary quantity X by $X^2$ or by a value derived from $X^2$ and updating the second auxiliary quantity Y by X*Y or by a value derived from X*Y, if a bit of the exponent equals 0, or updating the first auxiliary quantity X by X*Y or by a value derived from X*Y and updating the second auxiliary quantity Y by $Y^2$ or by a value derived from $Y^2$, if a bit of the exponent equals 1; and when the processor is operative to use the value of the first auxiliary quantity X as the result of the exponentiation after having sequentially processed all the bits of the exponent.

The present invention is based on the recognition that the square and multiply algorithm, which, on the one hand, is asymmetrical and, on the other hand, only allows a serial execution, has to be dispensed with. Instead the modular exponentiation is calculated using two auxiliary quantities. For each digit of the exponent, two multiplications are calculated, that is the multiplication of an auxiliary quantity by itself and the multiplication of the two auxiliary quantities. This concept can be considered as a Montgomery ladder basing on the fact that the difference between the two auxiliary quantities will always be that the relation of the auxiliary quantities among each other equals the base B.

It is an advantage of the present invention that, irrespective of what the value of the exponent is, the number of calculating operations will always be the same (two multiplications).

A further advantage of the present invention is that the two multiplications which have to be calculated for each exponent are independent of each other. The two multiplications thus can be calculated in parallel. It is especially this feature which leads to an increase in performance with a factor of 2 compared to the square and multiply algorithm with a dummy multiplication illustrated in FIG. 3. Even compared to the square and multiply algorithm without a dummy multiplication, an increase in performance with a factor of 1.5 can be obtained by the inventive concept.

It is to be noted that the inventive concept is inherently secure from timing and power attacks since the "calculating work" of the algorithm is always the same, irrespective of whether the digit of the exponent equals 0 or 1.

In preferred embodiments, the inventive concept is introduced for calculating modular exponentiations. For this, the two auxiliary quantities are reduced to the residual class regarding the module N at the end of processing each exponent, wherein any algorithm can be used to perform a multiplication and a modular reduction using look ahead techniques. The known ZDN method is pointed out again at this stage.

BRIEF DESCRIPTION OF THE DRAWINGS

Preferred embodiments of the present invention will be detailed subsequently referring to the appended drawings in which.

DESCRIPTION OF PREFERRED EMBODIMENTS

Figure 1:
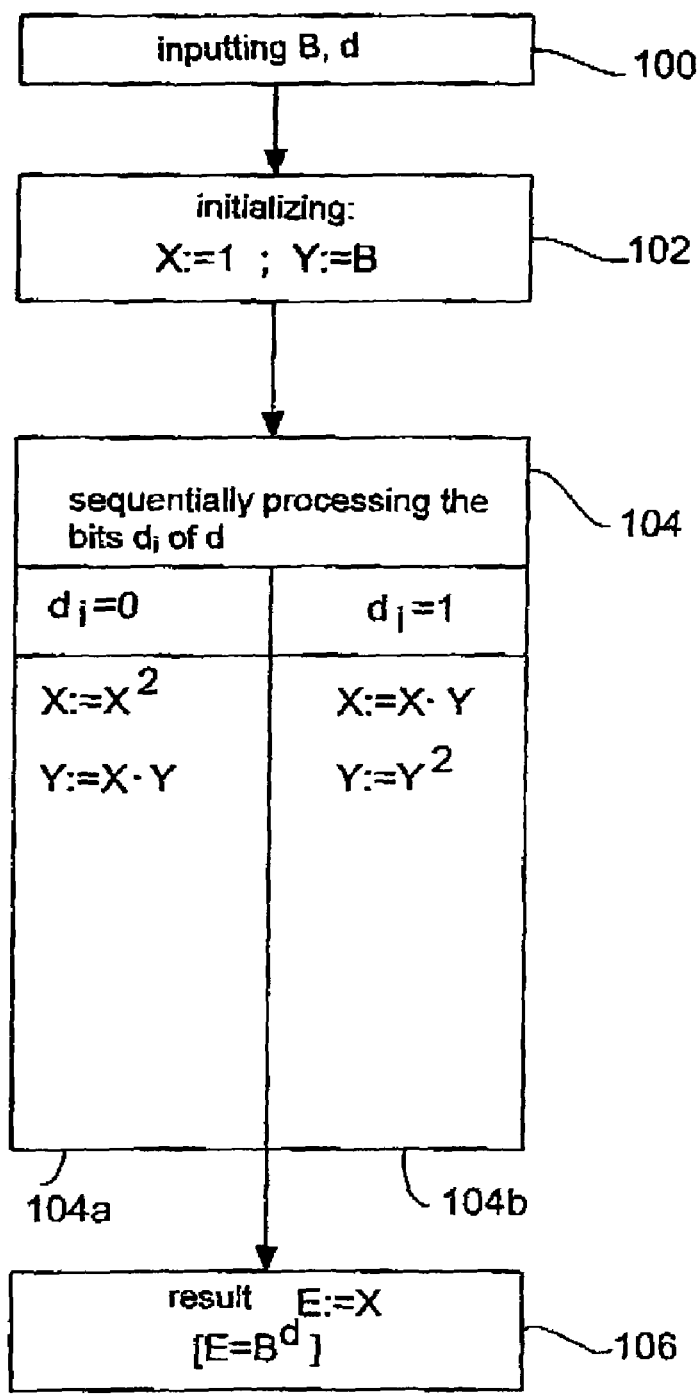
FIG. 1 shows a block diagram of the inventive method of calculating a result of an exponentiation.
Figure 3:
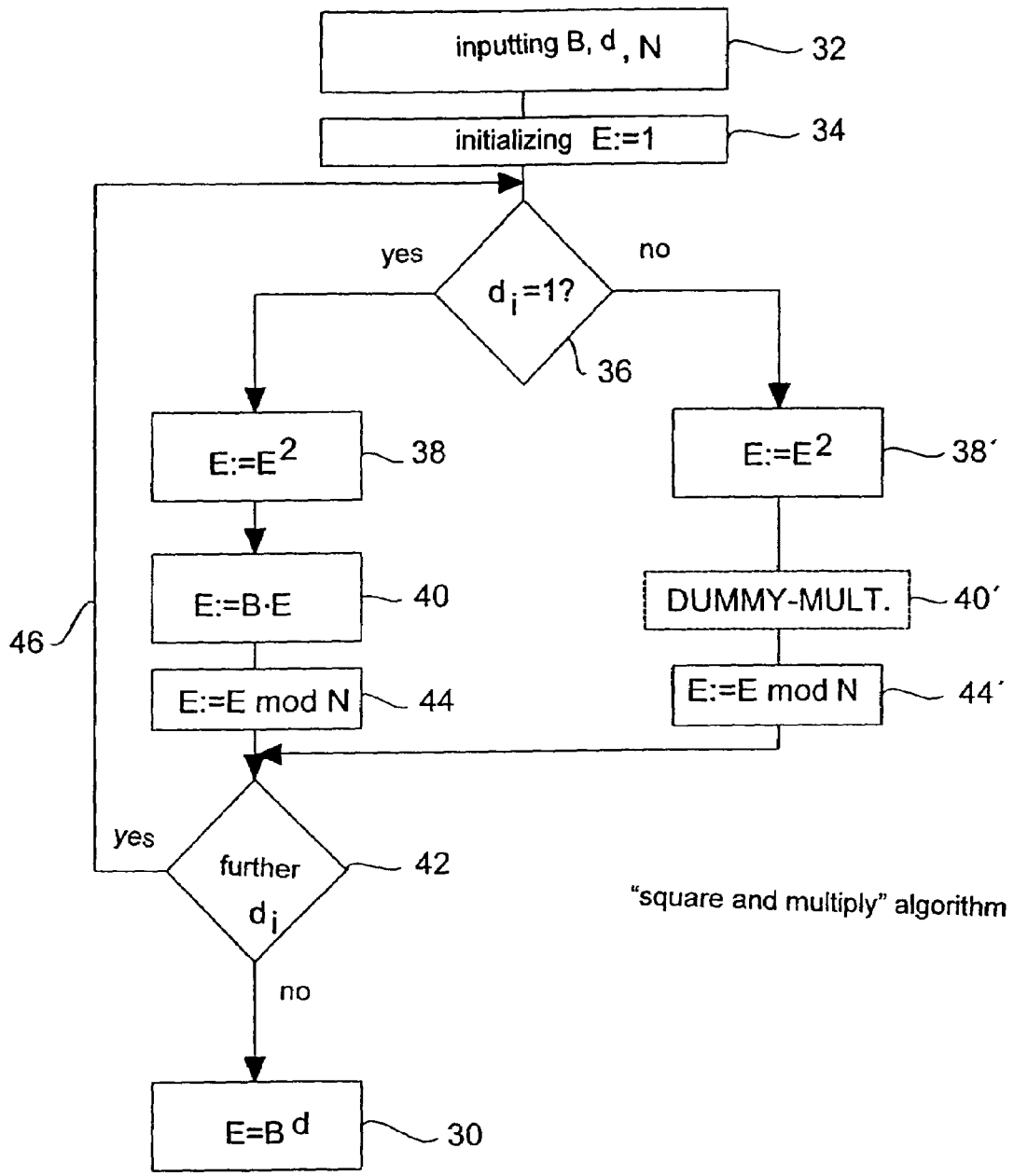
FIG. 3 is a general illustration of the well-known square and multiply algorithm with and without a dummy multiplication.

The same quantities as have been used in the description of FIG. 3 will be used in the subsequent description of the inventive concept. At first, the base B and the exponent d are input in step 100. In step 102, the two auxiliary quantities X and Y are initialized, as is illustrated in FIG. 1. In particular, X receives a value of 1, while Y receives the value of the base B. In block 104, the bits $d_i$ of the exponent d are preferably processed sequentially from the most significant bit of the exponent to the least significant bit of the exponent. If the current bit of the exponent $d_i$ equals 0, the left column 104a of block 104 is used, while, if the current bit $d_i$ of the exponent equals 1, the right column 104b of block 104 is used. In particular, if the exponent bit equals 0, the auxiliary quantity X is calculated in such a way that it equals the square of the old auxiliary quantity X. The auxiliary quantity Y is calculated in such a way that it equals the product of the old auxiliary quantity X and the old auxiliary quantity Y.

In the contrary case, that is when the digit considered of the exponent equals 1, the auxiliary quantity X is calculated such that it equals the product of the old auxiliary quantity X and the old auxiliary quantity Y. The second auxiliary quantity Y equals the square of the old auxiliary quantity Y.

It can be seen from FIG. 1 that the two products for calculating X and Y are independent of each other, that is they can be calculated in parallel. This ability to perform the calculation in parallel allows a high increase in performance.

When all the bits $d_i$ of the exponent d have been processed, a jump to step 106 is performed. Block 106 enables outputting the resulting value E. The value of the first auxiliary quantity X present at the end of processing all the bits equals the result of the exponentiation $B^d$.

The inventive concept will be illustrated subsequently referring to a simple numerical example. It is assumed that the exponent d is binary, has four digits and has the following value:

$$d=1011.$$

After step 102 of initializing, the two auxiliary quantities have the following values:

$$X=1; Y=B.$$

The most significant digit of the exponent d is 1. This means that the two auxiliary quantities, after a first passage of sub-block 104b, have the following values:

$$X=B; Y=B^2.$$

The next less significant digit of the exponent d equals 0. This has the consequence that the left sub-block 104a in block 104 has to be taken. At the end of processing by block 104a, the two auxiliary quantities have the following values:

$$X=B^2; Y=B^3.$$

The next less significant digit of the exponent is a 1. This means that, again, the right sub-block 104b of block 104 has to be passed. At the end of processing, the two auxiliary quantities have the following values:

$$X=B^5; Y=B^6.$$

The least significant digit of the exponent d finally has a value of 1. This means that, again, the right sub-block 104b of block 104 has to be passed. At the end of processing, the two auxiliary quantities have the following values:

$$X=B^{11}; Y=B^{12}.$$

Now all the bits of the exponent d have been processed and a jump to block 106 can be performed. The result of the exponentiation, that is the current value of the auxiliary quantity X, is $B^{11}$, the value 11 in the decimal system corresponding to the value 1011 in the binary system.

It is clear from the previous calculating example that all the intermediate results of the inventive concept are used, i.e. no dummy multiplications take place. All the intermediate results, apart from the result of the auxiliary quantity Y in the last step, are used. It is not required and thus does not have to be calculated necessarily. When it is determined that the last digit of the exponent is currently processed, it would be enough to calculate the first auxiliary quantity X only. For reasons of security, however, the parallel operating calculating unit for calculating the value of Y can also operate. Then the resulting value is no longer used.

Figure 2:
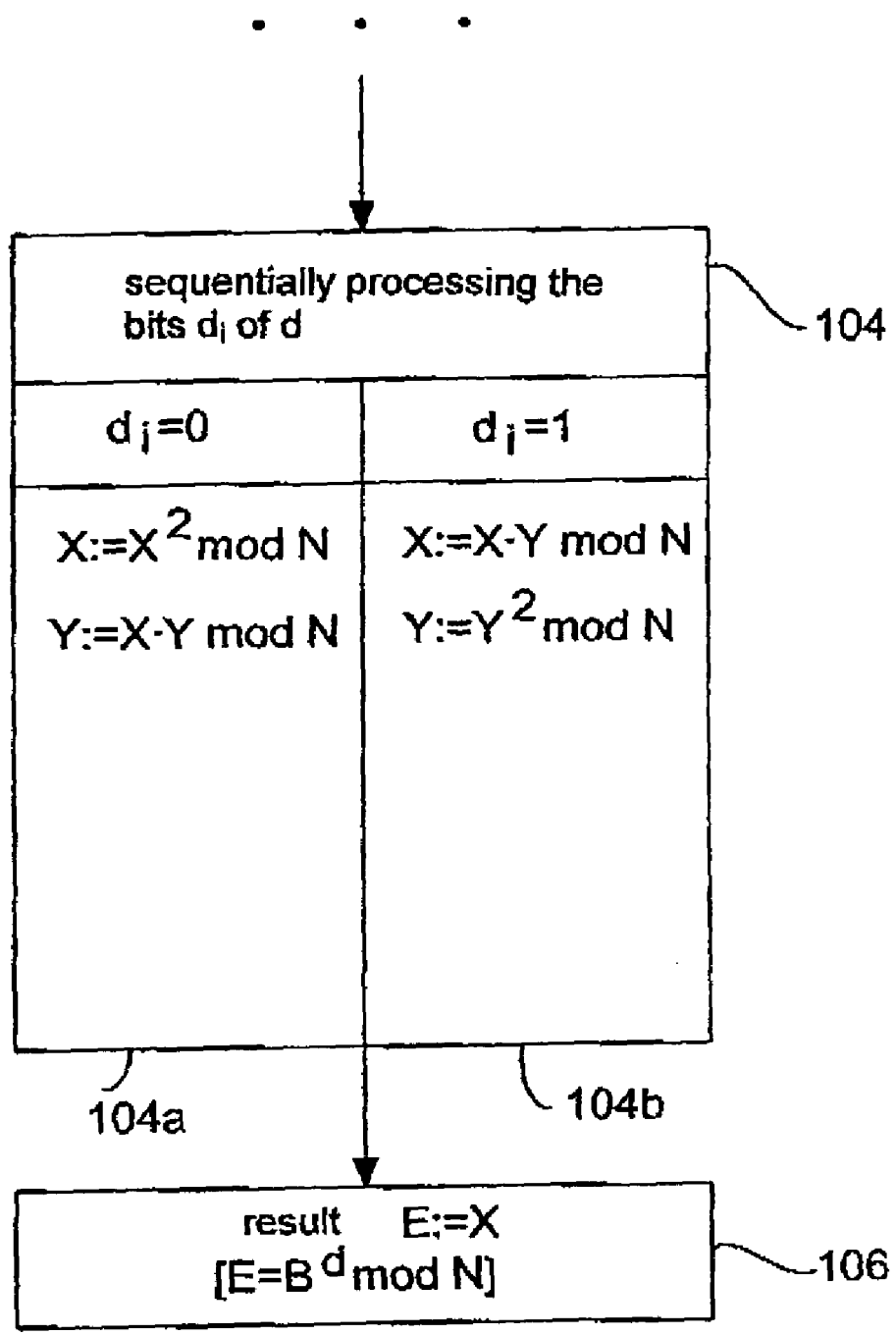
FIG. 2 shows a block diagram of the method of FIG. 1 with a modular reduction.

In the following, reference is made to FIG. 2. FIG. 2 only differs from FIG. 1 in that, instead of a conventional exponentiation, a modular exponentiation in the general units group of Z modulo N is calculated, as is for example used in the RSA method. For this, a modular reduction mod N takes place in each calculation of the auxiliary quantity, either in sub-block 104a or in sub-block 104b. This automatically leads to the fact that, at the end, the result of the modular exponentiation $B^d$ mod N is obtained.

In a pseudocode, the inventive algorithm is as follows:
Input: base B, module N exponent d
n:=length of the exponent d
i:=0
(X, Y):=(1, B)
while (i<n) do
if $d_i$=0, then
    (X, Y):=($X^2$ mod N, XY mod N)
else, if $d_i$=1, then
    (X, Y):=(XY mod N, $Y^2$ mod N)
end if
i:=i+1
end while
E:=X
Output: E (=$B^d$ modulo N).

The inventive concept is of advantage in that it homogenizes time profile and current profile and additionally allows an increase in performance due to the ability of performing operations in parallel. In addition, no calculated intermediate result is discarded. This is obtained by applying a concept similar to the Montgomery ladder for elliptic curves to any abstract groups, such as, for example, the units group of Z modulo N, as is, for example, used in the RSA method.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for encrypting including calculating a result E of an exponentiation $B^d$, B being a base and d being an exponent, wherein the exponent can be described by a binary number from a plurality of bits, comprising the following steps:

initializing a first auxiliary quantity X to a value of 1;
   initializing a second auxiliary quantity Y to the base B;
   sequentially processing the bits of the exponent by:
      first updating the first auxiliary quantity X by $X^2$ or by a value derived from $X^2$ and updating the second auxiliary quantity Y by X*Y or by a value derived from X*Y, if a bit of the exponent equals 0, or
      second updating the first auxiliary quantity X by X*Y or by a value derived from X*Y and updating the second auxiliary quantity Y by $Y^2$ or by a value derived from $Y^2$, if a bit of the exponent equals 1; and
   after sequentially processing all the bits of the exponent, using the value of the first auxiliary quantity X as the result of the exponentiation in order to secure data transmission.

2. The method according to claim 1, wherein in the step of sequentially processing is started from the most significant bit of the exponent.

3. The method according to claim 1,
   wherein the exponentiation is a modular exponentiation $B^d$ mod N, N being the module, and
   wherein the value derived from $X^2$, XY or $Y^2$ is generated by a modular reduction with the module N of $X^2$, XY and $Y^2$, respectively.

4. The method according to claim 3,
   wherein the modular exponentiation is used in an RSA decryption and/or and RSA encryption.

5. The method according to claim 3,
   wherein the exponent d, the base B and/or the module N are integers.

6. The method according to claim 1,
   wherein the second step of updating, if the bit of the exponent equals 1, the value $Y^2$ and the value X*Y are calculated parallel to each other.

7. The method according to claim 1,
   wherein in the first step of updating, if the bit equals 0, the value X*Y and the value $X^2$ are calculated parallel to each other.

8. A device for calculating a result E of an exponentiation $B^d$, B being a base and d being an exponent, wherein the exponent can be described by a binary number from a plurality of bits, comprising:

an initializer for initializing a first auxiliary quantity X to a value of 1 and a second auxiliary quantity Y to the base B; and a processor for sequentially processing the bits of the exponent by:

updating the first auxiliary quantity X by $X^2$ or by a value derived from $X^2$ and updating the second auxiliary quantity Y by X*Y or by a value derived from X*Y, if a bit of the exponent equals 0, or updating the first auxiliary quantity X by X*Y or by a value derived from X*Y and updating the second auxiliary quantity Y by $Y^2$ or by a value derived from $Y^2$, if a bit of the exponent equals 1;

wherein the processor is operative to use the value of the first auxiliary quantity X as the result of the exponentiation after having sequentially processed all the bits of the exponent.

9. The device according to claim 8, wherein the processor for sequentially processing comprises a first calculating unit and a second calculating unit, the first calculating unit and the second calculating unit being arranged to operate parallel to each other, and wherein the first calculating unit is arranged to calculate $X^2$ if the bit of the exponent equals 0 or to calculate X*Y if the bit of the exponent equals 1, and wherein the second calculating unit is arranged to calculate X*Y if the bit equals 0 and to calculate $Y^2$ if the bit equals 1.

\* \* \* \* \*